United States Patent [19]

Watanabe et al.

[11] 4,282,821
[45] Aug. 11, 1981

[54] ELECTRONIC CONTROL SYSTEM FOR SEWING MACHINES

[75] Inventors: Kazuo Watanabe, Hachioji; Hachiro Makabe, Fussa; Toshiaki Kume, Tachikawa; Toshihide Kakinuma, Tokyo; Hideaki Takenoya, Hachioji, all of Japan

[73] Assignee: Janome Sewing Machine Co., Ltd., Tokyo, Japan

[21] Appl. No.: 55,306

[22] Filed: Jul. 6, 1979

[30] Foreign Application Priority Data

Jul. 8, 1978 [JP] Japan ................... 53/83245

[51] Int. Cl.³ .................................. D05B 3/02
[52] U.S. Cl. ................................ 112/158 E
[58] Field of Search .......... 112/158 E, 121.11, 121.12; 318/567, 569

[56] References Cited

U.S. PATENT DOCUMENTS

| 4,141,305 | 2/1979 | Takenoya et al. | 112/158 E |
| 4,145,982 | 3/1979 | Kume et al. | 112/158 E |

FOREIGN PATENT DOCUMENTS

2757735  6/1978  Fed. Rep. of Germany ....... 112/158 E

*Primary Examiner*—Peter P. Nerbun
*Attorney, Agent, or Firm*—Michael J. Striker

[57] ABSTRACT

A first memory stores stitch control signals. A second memory stores these signals temporarily and reads them out to enable stitches to be formed. As a pattern is stitched, the first memory is readdressed and stitch control signals are successively written into and read out of the second memory. In one embodiment, the second memory is a RAM—in a second embodiment, the second memory is a shift register. Monostable multivibrators are used to operate the memories.

11 Claims, 5 Drawing Figures

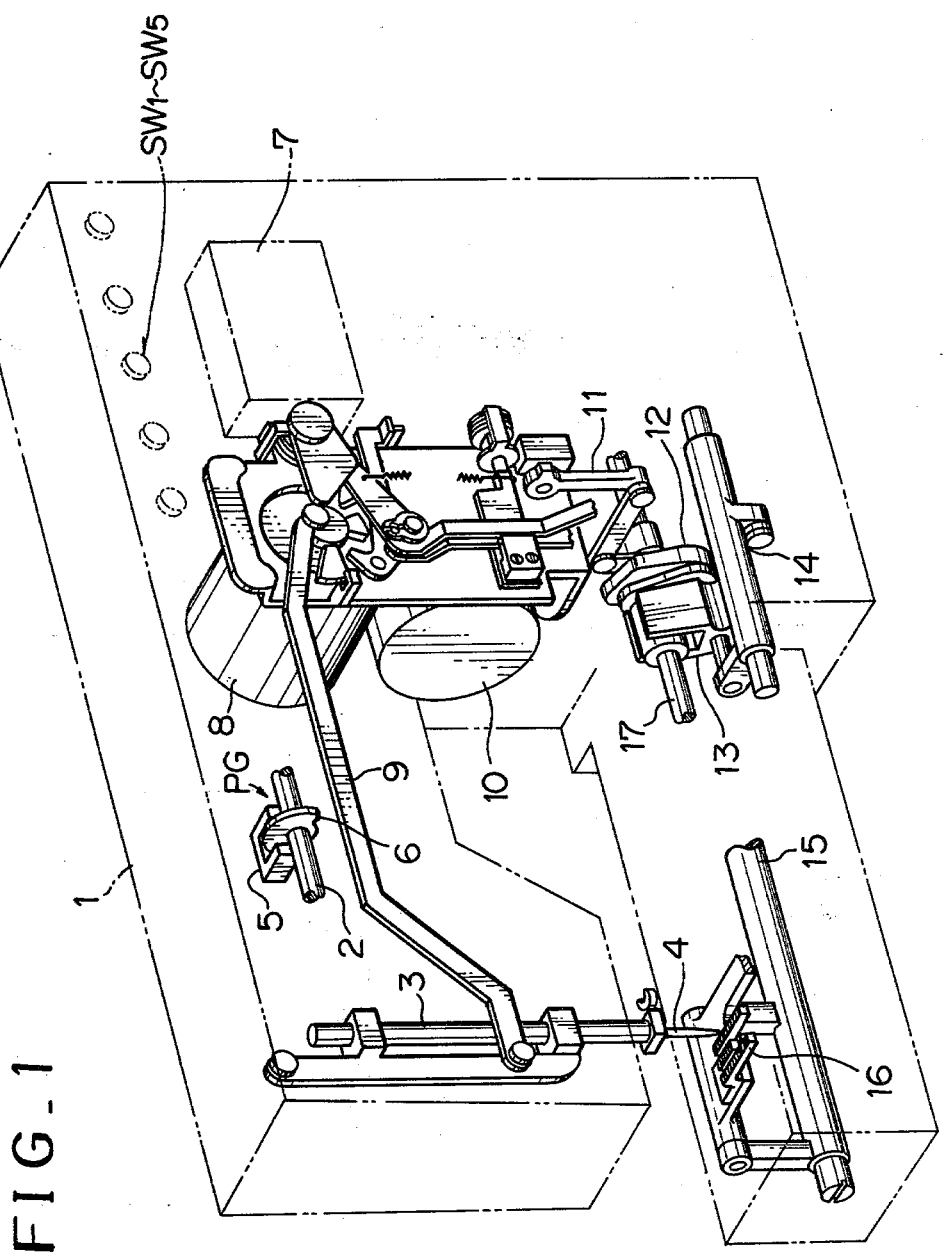
FIG_1

FIG.2-A
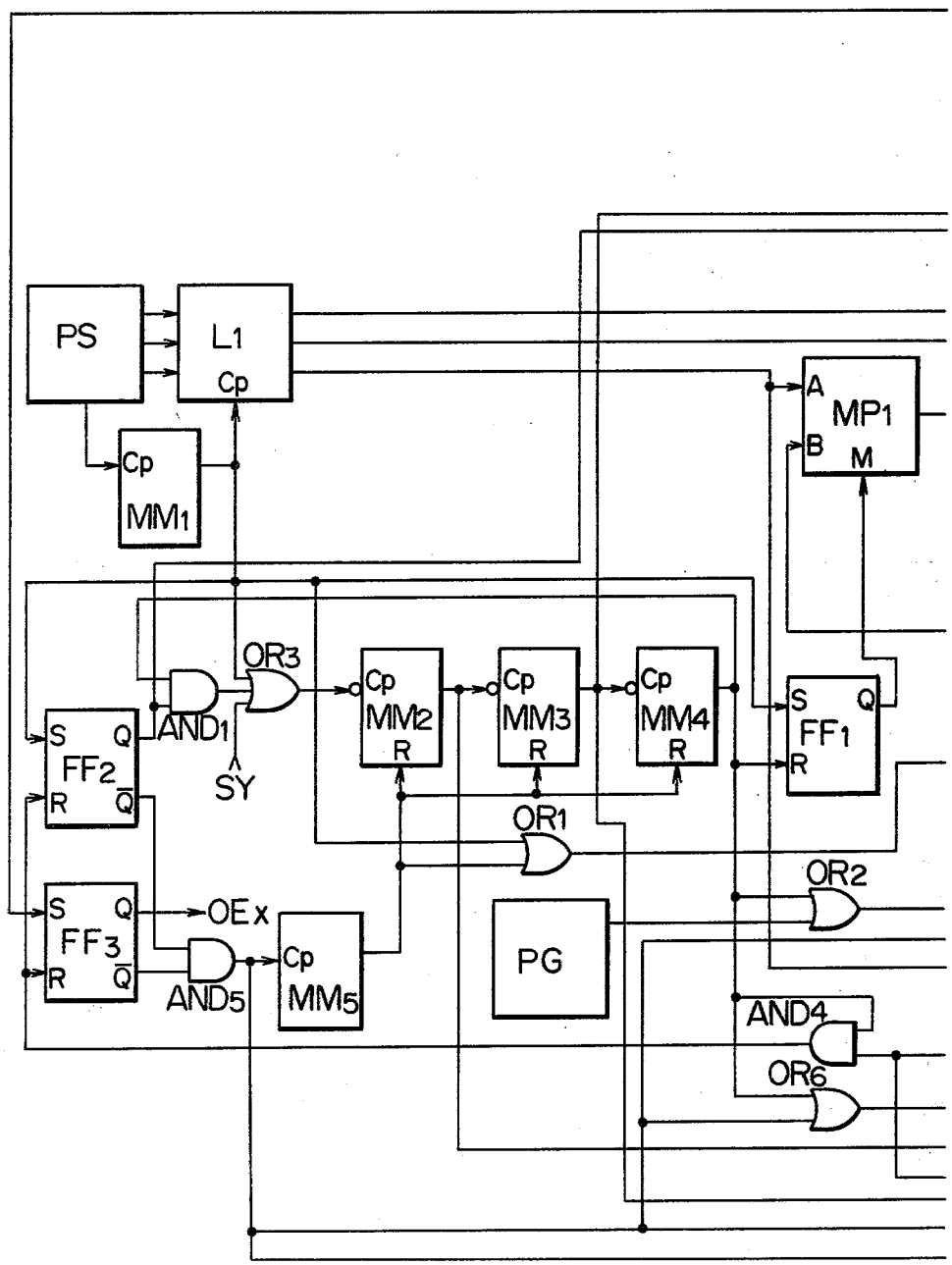

FIG_2-B
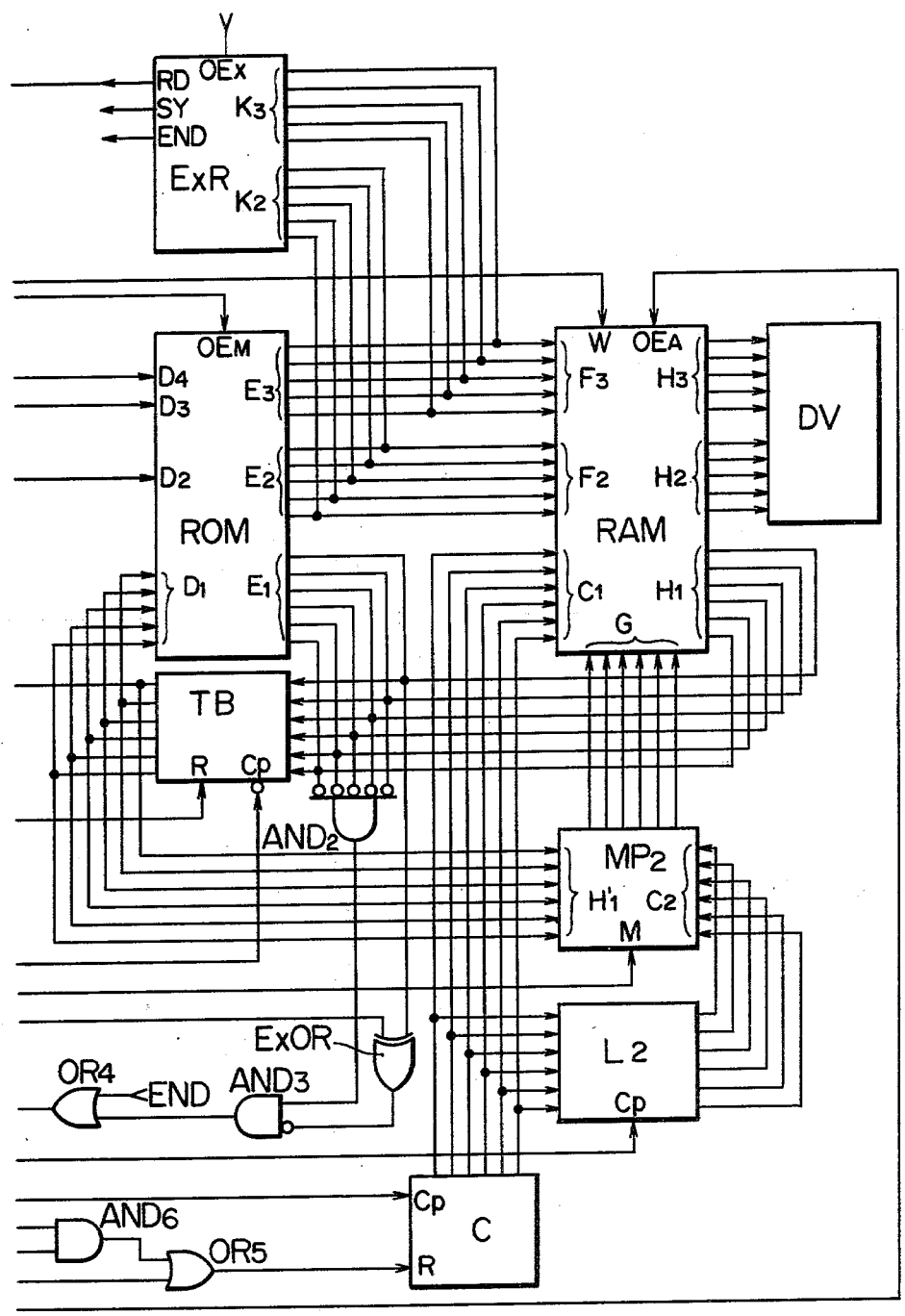

FIG_3-A
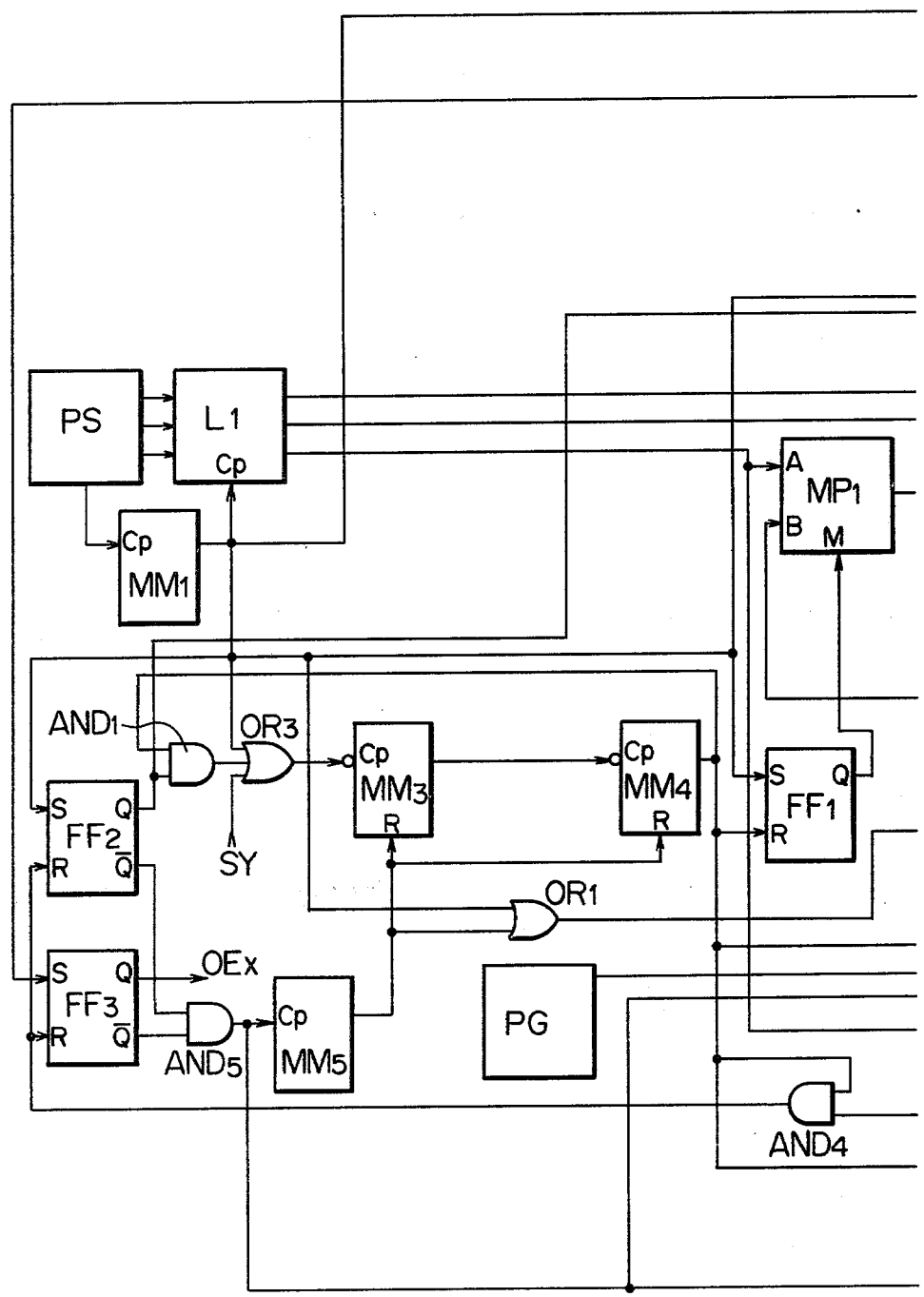

FIG. 3-B
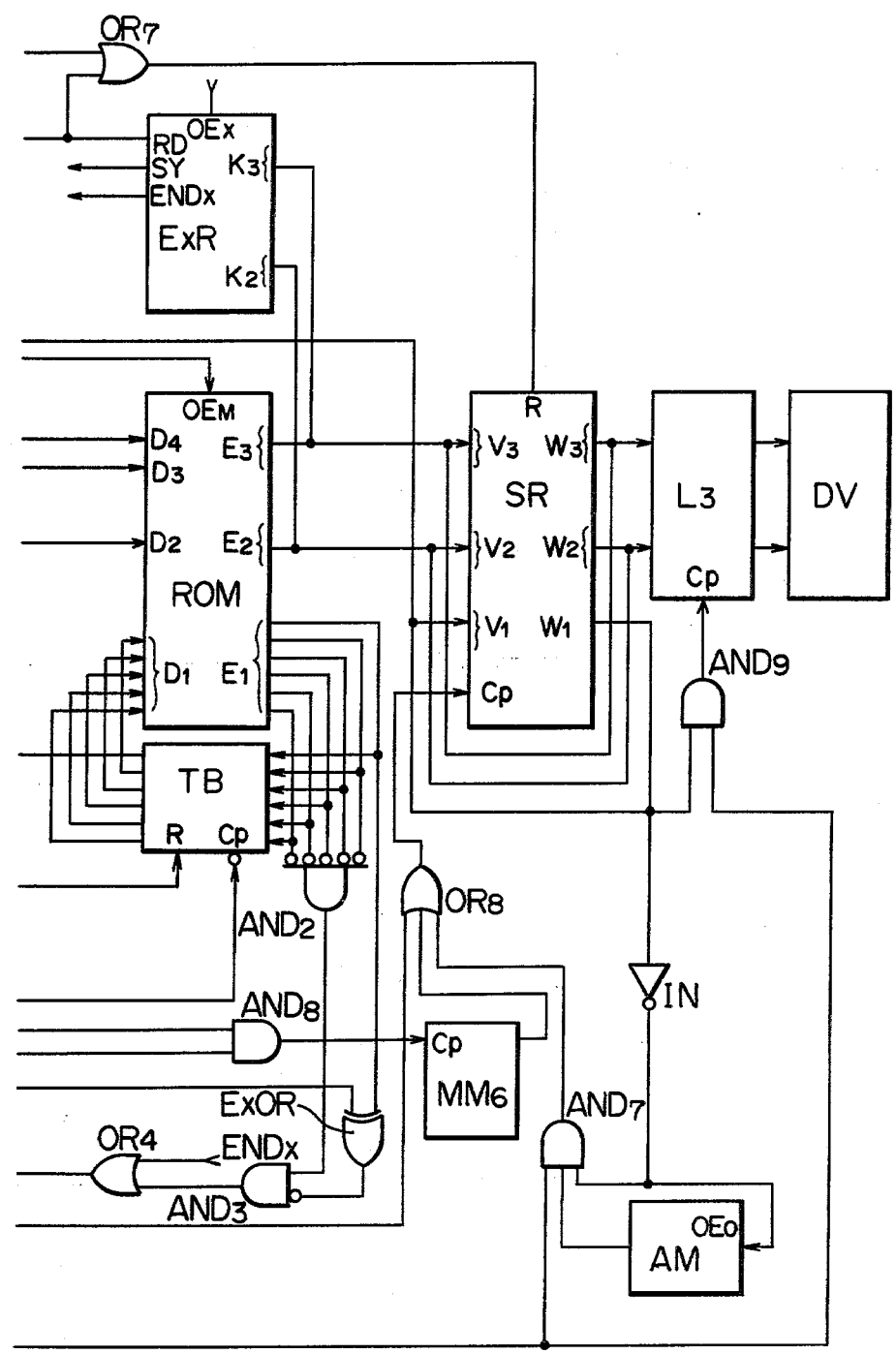

ELECTRONIC CONTROL SYSTEM FOR SEWING MACHINES

BRIEF DESCRIPTION OF THE INVENTION

This invention relates to an electronic control for a sewing machine of the type which has a pattern forming device for stitching patterns by varying relative positions of the fabric to be stitched and the needle. More particularly, this invention relates to an electronic control system for a sewing machine which is of simple structure and is able to stitch a large number of patterns.

It is, therefore, a primary object of the invention to store fixed pattern stitch control signals in a first semiconductor memory, and to produce many patterns without being limited to the signals so stored, by providing a second semiconductor memory for receiving signals transferred from the first semiconductor memory or from external sources such as magnetic tape or punch cards.

It is a second object of the invention to carry out exact electronic control of such sewing machine by means of a relatively simplified circuit structure.

The other features and advantages of the invention will be apparent from the following description of the invention in reference to the preferred embodiments as shown in the attached drawings.

BRIEF DESCRIPTION OF THE DRAWINGS

FIG. 1 shows a sewing machine in which the present invention is installed; and

FIGS. 2A-B and 3A-B are block diagrams of two preferred embodiments of the invention.

DETAILED DESCRIPTION OF PREFERRED EMBODIMENTS

In FIG. 1 reference numeral 1 is a machine housing, while reference numeral 2 is an upper shaft of the sewing machine driven by a machine motor (not shown) for vertically reciprocating needle bar 3 and needle 4.

The reference figure PG is a pulse generator which is synchronized with the upper shaft 2 to produce periodic pulses. Pulse generator PG is composed, as is generally known, of a U-shaped element 5 secured to machine housing 1 and carring a light-emitting diode (not shown), a phototransistor (not shown) opposite thereto, and a photo-interrupter 6 secured to upper shaft 2 and rotating therewith. Thus, pulse generator PG issues one positive signal for each rotation of upper shaft 2 when needle 4 is positioned above a needle plate (not shown). $SW_1$-$SW_5$ are pattern selecting switches, and 7 is a control system, 8 is a pulse motor for needle bar 3 laterally connecting rod 9 during rotation of pulse motor 8. Numeral 10 is a pulse motor for feeding the fabric, and controls horizontal movement of feed dog 16 via link 11, feed adjuster 12, fork rod 13, connecting link 14 and a horizontal feeding shaft 15. Numeral 17 is a lower shaft of the sewing machine. Lower shaft 17 rotates in synchronism with upper shaft 2 to rotate a loop taker (not shown).

FIGS. 2A-2B are a block diagram of a first embodiment of the invention, which is shown at 7 in FIG. 1. PS is a pattern selecting device including pattern selecting switches $SW_1$-$SW_5$ shown in FIG. 1. When a pattern is selected, that pattern is latched into latch circuit $L_1$ in the form of a 3-bit encoded signal. $MM_1$ is a monostable multivibrator which receives a selection control signal from pattern selecting device PS, and issues a signal in response. $C_8$, used throughout, denotes a gate terminal of that element in which it is shown. ROM is an electronic read-only memory storing stitch control signals, which has 8 address terminals $D_1$-$D_4$ and 16 output terminals $E_1$-$E_3$. $E_1$ outputs 6 bits for successively addressing ROM itself, $E_2$ outputs 5 bits for controlling fabric feed, and $E_3$ outputs 5 bits for swinging needle 3. $MP_1$ is a multiplexer having a mode input terminal M. Multiplexer $MP_1$ connects terminal $D_2$ of memory ROM to an input signal at A issued from latch circuit $L_1$ when mode input terminal M is logically high and connects terminal $D_2$ to an input signal at B issued from timing buffer TB when mode input terminal M is logically low. Timing buffer TB receives the address changing output at terminals $E_1$ and addresses inputs $D_1$ and $D_2$ of memory ROM. Timing buffer TB is reset when it receives at reset terminal R a pattern selection signal via OR gate $OR_1$, which signal is generated by monstable multivibrator $MM_1$. Timing buffer TB then receives an astable signal from monostable multivibrator $MM_4$ via OR-gate $OR_2$ and successively transmits the address changing signal at terminals $E_1$ to address input terminals $D_1$ and $D_2$ each time the astable signal falls prior to actual stitching. Read-only memory ROM then transfers all the signals of the selected pattern which appear at terminals $E_2$ and $E_3$ to a random access memory RAM. The oscillation velocity of the astable signal from monostable multivibrator $MM_4$ is, therefore, the readout velocity of read-only memory ROM. $FF_1$ and $FF_2$ are flip-flops and receive the output of monostable multivibrator $MM_1$ at their set terminals S. Flip-flop $FF_1$ receives the astable signal from monostable multivibrator $MM_4$ at its reset terminal R, and has an its output Q connected to the mode input M of multiplexer $MP_1$. Flip-flop $FF_2$ has a true output Q connected to an enable terminal $OE_M$ of read-only memory ROM. Therefore, flip-flop $FF_2$ is set by the pattern selection signal from monostable multivibrator $MM_1$ to activate read-only memory ROM and to read out the data therein. $MM_2$, $MM_3$, and $MM_4$ are monostable multivibrators each connected, via OR gate $OR_3$, to the output of $MM_1$ and are triggered on negative flanks of signals thereat. Monostable multivibrator $MM_3$ has an output connected to write-in terminal W of memory RAM, and monostable multivibrator $MM_4$ has an output connected to one input of AND-gate $AND_1$. True output Q of flip-flop $FF_2$ is connected to another input of $AND_1$ and is connected to an input terminal of monostable multivibrator $MM_2$ via OR-gate $OR_3$. Thus $MM_2$, $MM_3$, and $MM_4$ begin oscillating upon negative flanks of the signal from monostable multivibrator $MM_1$, and continue during the set period of flip-flop $FF_2$. Flip-flop $FF_1$, receiving the oscillating signal from $MM_4$ at resetting terminal R, is set by a pattern selecting signal from $MM_1$, and is reset by the following signal from $MM_4$. Thus, just after the pattern selection, the multiplexer $MP_1$ is caused route the signal at terminal A of the latch circuit $L_1$ to address terminal $D_2$ of the ROM. Thereafter, multiplexer $MP_1$ is caused to similarly route the signal at terminal B, which signal is successively issued via timing buffer TB. Of the address signals for reading out an initial stitching signal of the pattern, the data at terminals $D_1$ are all initially 0. The address changing signal at terminals $E_1$, as compared with the final stitching signal has, at this time, an uppermost 1 bit which is identical with the signal at input A of the multiplexer $MP_1$, all other bits being 0. AND-gate $AND_3$ receives an output signal from exclusive OR-gate ExOR for detecting whether or not these signals are the same, and likewise receives an output from AND-gate $AND_2$ for detecting whether or not they are both 0. $AND_3$ is connected to resetting terminal R of flip-flop $FF_3$ via $OR_4$ and $AND_4$ (which is also connected at an input to the output of $MM_4$) and resets the flip-flops when ROM reads out the final stitching signal. $FF_3$ is a flip-flop which is reset together with flip-flop $FF_2$. The output of AND-gate $AND_5$ (which has inputs connected to complement outputs $\overline{Q}$ of $FF_2$ and $FF_3$) is connected to an input of $MM_5$. The output of $MM_5$ is connected to the resetting terminals R of $MM_2$, $MM_3$ and $MM_4$ and also is connected to the other input of $OR_1$ so as to reset $MM_2$, $MM_3$ and $MM_4$ and the timing buffer TB when the final stitching signal is produced. C is a counter, and the output of $AND_6$ (which has inputs connected to the output of $OR_4$ and the output of $MM_3$) and the output of $AND_5$ are both connected to its resetting terminal R via $OR_5$. Counter C is counted up by output of $MM_2$, and its 6-bit output is connected to the address changing terminals $C_1$ of the RAM to be stored matching pattern input data of inputs $F_2$ and $F_3$ of RAM, as well being connected to the address signal terminal G of RAM via latch circuit $L_2$ and multiplexor $MP_2$, so that the counter C may write in the RAM. Latch circuit $L_2$ receives the outputs of $AND_5$ and $MM_4$ via $OR_6$ at its gate terminal $C_p$. The multiplexer $MP_2$ receives the output of $AND_5$ at its mode input M, and when mode input M is logically low, $MP_2$ transmits the signal at inputs $C_2$ from counter C to serve as an address signal at G for writing in RAM. When mode input M is logically high, $MP_2$ transmits at inputs $H'_1$ from the 6 bit output $H_1$ of RAM for use as an address signal to G. RAM operates substantially the same as does ROM in readout mode, and timing buffer TB is used both with ROM and with RAM. However, at their gate inputs, ROM receives the astable signal from $MM_4$, while RAM receives signals from pulse generator PG (shown in FIG. 1) via $OR_3$. Terminals $H_2$ and $H_3$ of 5 bits each are connected to pulse motor driving device DV to drive it with stitching signals which are produced in the same order as the fabric feed controlling signals from outputs $E_2$ or $K_2$ and needle swinging amplitude signals from $E_3$ or $K_3$, i.e. from ROM or an external memory reader device ExR. $OE_A$ of RAM is an enable terminal connected to the output of $AND_5$ so as to read out the RAM when $OE_A$ is logically high. ExR is an external memory reader which employes magnetic tape or punch cards, and 5 bit stitching signal outputs $K_2$ and $K_3$ are connected to outputs $E_2$ and $E_3$ of ROM and thus to inputs $F_2$ and $F_3$ of RAM. Terminal RD carries a readout signal which is produced in response to manual operation when reader ExR is used, and this readout signal is delivered to set terminal S of $FF_3$. True output terminal Q of $FF_3$ is connected to the terminal $OE_X$ of RAM, and manual operation causes a readout of ExR and a write in of RAM until such readout ceases, as is the case with the ROM. SY is a synchronous signal output terminal which carries a signal generated in response to each of the stitching signals. This signal is delivered to an input of $OR_3$ so as to cause $MM_2$, $MM_3$, $MM_4$ to issue a one shot pulse each time the signal is produced, so as to count up counter C and to activate terminal W of RAM and latch circuit $L_2$. END is an ending signal output terminal matched with said stitching signals $K_2$, $K_3$ for recognizing end of readout by detecting an 11th bit of data, and is connected to an input of $OR_4$. END is reset along with $FF_3$, by the ending signal matching control signal of the final stitch so as to stop readout of ExR and write in into the RAM.

In this first embodiment when any of the pattern selecting switches $SW_1$–$SW_5$ in pattern selector PS is operated in order to stitch the corresponding pattern according to data stored in ROM, a 3 bit code designating the pattern is produced, and this code is latched into latch circuit $L_1$ while $MM_1$ operates $FF_1$ sets and multiplexer $MP_1$ transmits a 3 bit address code to inputs $D_2$, $D_3$ and $D_4$ of ROM to serve as a pattern code. Since TB is reset via $OR_1$, the address bits at $D_1$ of ROM are all 0, and the code composed of the address data at $D_1$, $D_2$, $D_3$ and $D_4$ is set to generate the initial stitching signals at $E_2$ and $E_3$, with $FF_2$ being concurrently set for producing the address signal for reading out the second addressing signal at $E_1$ to cause the enable terminal $OE_M$ to readout the ROM. The pattern selecting signal causes $MM_2$ to issue a one shot pulse via $OR_3$ and counts counter C to a decimal code 1 on the negative pulse flank. This makes the address changing date at $C_1$ match the initial stitching signals $E_2$ and $E_3$ of the RAM for addressing the next (i.e. the second) stitch. $MM_3$ issues a one shot pulse at the negative flank of the pulse from pulse terminal W of the RAM, beginning write in. The address data at G is all 0's at this time, since mode input M of $MP_2$ is at logically low via $AND_5$ and does not receive the gate signal at Cp of latch circuit $L_2$, and the address data at G stores a signal which matches the initial stitching signal and the 2nd stitch addressing signal at the 0 address. Subsequently, $MM_4$ issues a one shot upon a negative flank of the pulse from $MM_3$. $FF_1$ is thus reset by this signal and $MP_1$ transfers the data at B (which has passed through TB) to input $D_2$ of ROM. Latch circuit $L_2$ receives the gate signal at Cp via $OR_6$ and latches decimal code 1 from the counter C, to cause the address data at G of RAM to correspond to an address of 1. The rising output signal from $MM_4$ gives a signal to the gate Cp of TB and transfers the addressing signals $E_1$ for the 2nd stitch to address terminals $D_1$ and $D_2$ of ROM. A match of the signals at address terminals $D_1$ and $D_2$ and signals at $D_3$ and $D_4$ from PS forms an address signal for reading out the 2nd stitch signals at $E_2$ and $E_3$ and the addressing signal to the third stitch. $MM_2$ then issues another one shot pulse via $AND_1$ and $OR_3$ upon the negative flank of the output signal from $MM_4$. Subsequently $MM_2$, $MM_3$ and $MM_4$ successively advance one shot pulses and repeat them to read out the ROM write in RAM. The address changing signal at $E_1$ coincides at its uppermost bit with the lowest bit from latch circuit $L_1$. ROM reads out final stitching signals at $E_2$ and $E_3$ in accordance with the address signals appearing at $D_1$ and $D_2$, which address signals pass through TB as the output signal from $MM_4$ rises. Since the lower 5 bits at $E_1$ remain 0, the output of $AND_2$ is brought logically high. Moreover, the output of ExOR is low, so that the output of $AND_3$ goes high and the output of $OR_4$ goes logically high.

Meanwhile, the output from $MM_4$ drops, causing the output of $MM_2$ to drop, causing counter C to count up one count. A subsequent pulse from $MM_3$ resets counter C via $AND_6$ and $OR_5$, since the output of $OR_4$ is still logically high. Thus, the data appearing at RAM inputs $C_1$ is all zero. Since terminal W of RAM is logically high, RAM is placed in the writein mode, and the latter serves as an initial stitch addressing signal enabling the data at ROM outputs $E_2$ and $E_3$ to be written into RAM. A subsequent output signal from $MM_4$ resets $FF_2$ and FF$_3$ via AND$_4$ (which receives the logically high output of OR$_4$), resets MM$_2$, MM$_3$ and MM$_4$ via AND$_5$ and MM$_5$, and further resets TB via OR$_1$ so that transfer of data from ROM to RAM is completed. The high output of AND$_5$ is delivered to enable terminal OE$_A$ of RAM to cause RAM to operate in the readout mode. The high output of AND$_5$ is delivered via OR$_5$, to terminal R of counter C, to reset counter C and to start writein in RAM.

The ending of such writein causes RAM to give an initial stitch control signal to the pulse motor driving device DV. The mode of the multiplexer MP is changed by the logically high output of AND$_5$ and the address signal at G of RAM turns into a signal passing through TB, but TB designates the 0 address upon resetting and issues an output of an initial stitching signal. When the sewing machine is driven, the pulse generator PG issues one pulse for early rotation of the sewing machine, and the timing buffer TB transfers addressing data at H$_1$ of RAM to the addressing terminal G upon each rotation to advance the stitching signals at H$_2$ and H$_3$. When the stitching pattern is finished, the pattern i- returned to its initial state, and TB repeatedly delivers a stitch controlling signal to the pulse motor driving device DV so as to drive the pulse motors 10 and 8 for controlling the needle swing and fabric feed.

With respect to the data transfer to RAM from the external storing device ExR, for reading magnetic tape or punched cards when the reader is operated, the readout command signal at RD sets FF$_3$ and gives a signal to the enable terminal OE$_X$ to make the pattern controlling signals at K$_2$ and K$_3$ available to RAM. When the pattern controlling signal is produced, the synchroneous signal SY is produced synchronously therewith to cause MM$_2$, MM$_3$ and MM$_4$ to issue one shot pulses in succession. ExR like ROM during readout, stores only one stitching signal, and a subsequent signal at SY causes a following stitching signal to be stored, and when storage of all the stitches is finished an end signal at END resets FF$_3$ via OR$_4$ to finish readout operation and writein in RAM, so that RAM can subsequently be read out.

The second embodiment of the invention shown in FIG. 2 employs the random access memory RAM for temporary storage, while the second embodiment uses a shift register SR. Parts common to those in FIG. 2 are designated with the same reference characters and explanation thereof will be omitted. ROM is read out in the same fashion as in FIG. 2. For simplicity the 5 bit pattern control signal terminals E$_2$ and E$_3$ and terminals connected thereto are shown as one terminal and one connecting line. SR is a shift register in which input terminals V$_2$ and V$_3$ of 5 bits each receive stitch control signals from E$_2$ and E$_3$ of ROM and stitching control signals from K$_2$ and K$_3$ of ExR. SR is composed of parallel connections of 11 bits between input terminals V$_2$ and V$_3$, output terminals W$_2$ and W$_3$ (of 5 bits each) an input terminal V$_1$ for determining whether or not data entering from input terminals V$_2$ and V$_3$ are stitching signals, and output terminal W$_1$. The shift register has a resetting terminal R receiving an output signal from MM$_1$ and from RD of ExR via OR$_7$, and also has a shift pulse input terminal Cp. Output terminals W$_1$, W$_2$ and W$_3$ provide 11-bit data to input terminals V$_1$, V$_2$ and V$_3$, and the signals at terminals W$_2$ and W$_3$ compose the stitch control signal and are connected to DV via a latch circuit L$_3$. Shift register ST of the input terminals V$_1$, V$_2$, V$_3$ and the output terminals W$_1$, W$_2$, W$_3$ of respective 11 tracks at both sides, has the bit number (step number) which is more than the maximum stitch number of the pattern to be selected and is the same number. Shift register SR stores the pattern signals E$_2$ and E$_3$ or K$_2$ and K$_3$ at the shift pulse terminal Cp, and receives the output of MM$_4$ via OR$_8$ in order to shift said pattern signals. AM is an astable multivibrator whose enable terminal OE$_0$ receives the output signal at W$_1$ or SR via inverter IN so as to oscillate when output W$_1$ is logically low that is, when the signals are not stitching signals. AND$_7$ receives both an input signal to and an output signal from AM the output from AND$_5$, and provides a signal to shift pulse terminal Cp of shift register SR via OR$_8$. This construction shifts the data stored in SR until output W$_1$ goes logically high, i.e. until signals at W$_2$ and W$_3$ respond to stitching signals, after the data transfer from ROM to SR is complete and the output of AND$_5$ becomes logically high. The output of the pulse generator PG is rated to MM$_6$ via AND$_8$ (which also receives the output signal from AND$_5$ at its other input), and causes a shift signal to appear at shift pulse terminal Cp of shift register SR via OR$_8$ so as to shift the signal within shift register SR each time the sewing machine rotates to saw a stitch. AND$_9$ receives both the output signal from AND$_5$ and the signal at W$_1$ of SR, and when the signal at W$_1$ is high, AND$_9$ causes latch circuit L$_3$ to deliver the signals at W$_2$ and W$_3$ SR to DV.

In the embodiment shown in FIG. 3, the output of MM$_1$ (determined in accordance with operation of pattern selector PS) resets TB via OR$_1$ and resets shift register SR via OR$_7$. The rising flank of a first signal from MM$_4$ provides a shift pulse to SR via OR$_8$, and simultaneously causes a logically high signal to appear at input terminal V so as to store it in first bit cell and to thereby store, at that 0 address stitching signals at E$_2$ and E$_3$ for a first stitch which latter signal appears at input terminals V$_2$ and V$_3$. Due to the rising signal of MM$_4$, the outputs at E$_2$ and E$_3$ of ROM become signals for a second stitch, and upon receipt of a subsequent rising signal from MM$_4$, the signal stored in the first bit cell is shifted to a second bit cell, and the first bit cell corresponding to terminals V$_1$, V$_2$ and V$_3$ of shift register SR stores the first and second stitching signals as a stitching signal for a second stitch. This shifting is repeated in succession, and when the logically high signal and the final stitching signal are stored in the first bit cell, the signal for the first stitch and the first stitching signal are shifted by the stitching number composed of the stitch pattern. Since the step number of the shift register SR is increased higher than this stitching number, these signals do not reach output terminals W$_1$, W$_2$ and W$_3$. When ROM issues the output of the final stitching signal, FF$_2$, FF$_3$, TB, MM$_3$ and MM$_4$ are reset, the signal at OE$_N$ of ROM becomes low and ROM accordingly, becomes inoperative. The output of AND$_5$ is then logically high. When a signal for stitching a seam does not reach output terminals W$_1$, W$_2$ and W$_3$, terminal W$_1$ is low, and AM oscillates. This oscillation delivers shift pulses to shift register SR via AND$_7$ and OR$_8$, and shifts the stitching data until output signal at W$_1$ becomes high, that is, until the initial stitching signal reaches output terminals W$_2$ and W$_3$. When the output signal at W$_1$ becomes high, AM provides a clock pulse to latch circuit L$_3$ via AND$_9$, and causes initial stitching signals at W$_2$ and W$_3$ to be delivered to DV. When the sewing machine is rotated, pulse generator PG issues a signal for each rotation, and the shift register SR successively shifts the data to advance it to output terminals $W_2$ and $W_3$. When the stitching signal ends and output signal at $W_1$ becomes low again, AM oscillates to shift shift register SR and to provide an initial stitch signal for pattern repetition. Thus, stitch patterns are repeated.

Readout from ExR and from ROM to SR is the same as in FIG. 2, and ROM operation is carried out here in the same fashion as has been described there.

As mentioned above, the present invention enables patterns to be formed by the stitching signals stored in ROM, and also enables patterns stored in ROM, and also enables patterns to be formed by reading magnetic tape and punched cards in reader ExR. Since address data for ROM are based on the output data from the ROM, the elements which control readout of ROM, readout of of ExR, operation of RAM, and the writing-in timing to shift register SR, may be used in common. Accordingly, the circuit structure is relatively simple and exact in operation.

We claim:

1. An electronic control system for use in sewing machines which vary needle position and fabric feed in order to stitch a plurality of stitch patterns in accordance with stitch control signals, comprising: a pulse generator issuing pulses in synchronism with rotation of the sewing machine; a first memory storing a plurality of stitch control signals; a user-operable pattern selector for selecting an initial address within the first memory; a plurality of monostable multivibrators which are connected to each other and to the pattern selector in a manner that the monostable multivibrators oscillate when the pattern selector is operated; and a second memory connected to the pulse generator, the first memory and said plurality of monostable multivibrators, the second memory operating in a manner that each time an oscillation of the monostable multivibrators takes place, a stitch control signal is read out of the first memory and temporarily stored in the second memory, and each time the pulse generator generates a pulse, a stitch control signal temporarily stored in the second memory is read out therefrom and used to vary needle position and fabric feed.

2. The electronic control system defined by claim 1, wherein the first memory is a read-only memory with 8 address bits.

3. The electronic control system defined by claim 2, wherein the first memory has 6 first output terminals for readdressing the first memory, wherein the first memory has 5 second output terminals for controlling fabric feed, and wherein the first memory has 5 third output terminals for controlling needle sewing amplitude.

4. The electronic control system defined by claim 1, wherein the pattern selector incudes a plurality of user-operable pattern selecting switches, a 3 bit encoder connected thereto, and a latch circuit connected to the encoder, the pattern selector operating in a manner that when a pattern selecting switch is operated, a 3 bit code is encoded by the encoder and latched into the latch circuit.

5. The electronic control system defined by claim 1, wherein the plurality of monostable multivibrators includes a first monostable multivibrator, a second monostable multivibrator, a third monostable multivibrator and a fourth monostable multivibrator, wherein each of the monostable multivibrators have an input and an output, the output of the first monostable multivibrator being connected to an input of an OR-gate, an output of the OR-gate being connected to the input of the second monostable multivibrator, the output of the second monostable multivibrator being connected to the input of the third monostable multivibrator, the output of the third monostable multivibrator being connected to the input of the fourth monostable multivibrator, the output of the fourth monostable multivibrator being connected to an input of an AND-gate which has an output connected to another input of the OR-gate, the output of the first monostable multivibrator being further connected to the set input of a flipflop which also has an output, the output of the flipflop being connected to another input of the AND-gate, and the output of the third monostable multivibrator being further connected to the second memory to allow a stitch control signal to be stored therein upon oscillation of the monostable multivibrators.

6. The electronic control system defined by claim 3, wherein the second memory has 5 second input terminals connected to the second output terminals of the first memory, wherein the second memory has 5 third input terminals connected to the third output terminals of the first memory, wherein the second memory has 5 second output terminals and 5 third output terminals whereby fabric feed and needle swing amplitude can be controlled by the second memory in an order identical to that order in which signals appear at the second and third output terminals of the first memory, and wherein the control system further includes a pulse motor driving device connected to the second and third output terminals of the second memory.

7. The electronic control system defined by claim 1, wherein the second memory has an enable terminal which is connected to an output of an AND-gate, and which, when in a logically high state, causes the second memory to read out stitch control signals.

8. The electronic control system defined by claim 1, wherein the second memory is an 11 bit shift register with a discriminating input connected to one of said plurality of monostable multivibrators, the discriminating input indicating presence of and lack of presence of stitch control signals at the shift register.

9. The electronic control system defined by claim 8, wherein the electronic control system further includes a pulse motor driving device controlled by the second memory via a latch circuit, and wherein the electronic control system further includes an external reader connected to the second memory for enabling stitch control signals to be introduced from an external source.

10. The electronic control system defined by claim 1, further including a timing buffer connected to the pulse generator and the second memory, the timing buffer cyclicly advancing the stitch control signals in response to receipt of a pulse from the pulse generator, whereby after a stitch pattern is completed the stitch pattern is repeated.

11. The electronic control system defined by claim 8, wherein the pulse generator is connected to the shift register and shifts data therein each time the pulse generator generates a pulse, and wherein the electronic control system further includes an astable multivibrator which is connected to the shift register and oscillates after a stitch pattern is completed, whereby the stitch pattern can be repeated once again.

* * * * *